(12) United States Patent
Wegert et al.

(10) Patent No.: US 6,562,468 B2
(45) Date of Patent: May 13, 2003

(54) METHOD OF ELIMINATING AND A LAMINATE WHICH ELIMINATES AESTHETICALLY UNACCEPTABLE HUES VISIBLE THROUGH LIGHT-COLORED TRANSLUCENT OVERLAYS

(75) Inventors: Theodore Allen Wegert, Louisville, KY (US); Karen Joan Thompson, Louisville, KY (US)

(73) Assignee: Baron Industries, Cor., Dalton, GA (US)

(*) Notice: Subject to any disclaimer, the term of this patent is extended or adjusted under 35 U.S.C. 154(b) by 0 days.

(21) Appl. No.: 09/923,418

(22) Filed: Aug. 8, 2001

(65) Prior Publication Data

US 2003/0029560 A1 Feb. 13, 2003

(51) Int. Cl.$^7$ .................................................. B32B 9/04
(52) U.S. Cl. ........................ 428/447; 428/1.2; 428/1.21; 428/1.32; 428/1.3; 156/63; 126/211; 434/102
(58) Field of Search .................... 428/447, 1.2, 1.21, 428/1.23, 1.32, 1.3; 156/63; 126/211; 434/102

(56) References Cited

U.S. PATENT DOCUMENTS

| 4,477,486 A | 10/1984 | Boaz |
| 5,036,831 A | 8/1991 | Ray |
| 5,185,047 A | 2/1993 | Ray |
| 5,370,905 A | 12/1994 | Varga et al. |
| 5,429,114 A | 7/1995 | Taplan et al. |
| 5,492,750 A | 2/1996 | Shumaker, Jr. et al. |
| 5,571,434 A | 11/1996 | Cavener et al. |
| 5,584,957 A | 12/1996 | Schultheis et al. |
| 5,768,434 A | 6/1998 | Ran |
| 5,785,047 A | 7/1998 | Bird et al. |
| 5,791,336 A | 8/1998 | Helm |

FOREIGN PATENT DOCUMENTS

EP        0994147 A1 * 4/2000

* cited by examiner

Primary Examiner—Robert Dawson
Assistant Examiner—Christopher Keehan
(74) Attorney, Agent, or Firm—Diller, Ramik & Wight

(57) ABSTRACT

The present invention relates to a method of eliminating and a laminate which eliminates an aesthetically unacceptable hue normally visible at an area of overlap between a light-colored substrate that reflects a certain wavelength of light back to and through a light-colored translucent overlay. Specifically, the method includes applying a dark material to at least one of the light-colored substrate and the light-colored translucent overlay upon an area of overlap of the substrate and overlay, and sandwiching the dark material between the overlay and the substrate at the area of overlap so that certain wavelengths of light normally passing through the overlay into the substrate and reflected by the substrate back to and through the overlay are blocked by the dark material. The light-colored overlay in the area of overlap appears in its true light color to the "naked" eye absent the aesthetically unacceptable hue.

33 Claims, 2 Drawing Sheets

METHOD OF ELIMINATING AND A LAMINATE WHICH ELIMINATES AESTHETICALLY UNACCEPTABLE HUES VISIBLE THROUGH LIGHT-COLORED TRANSLUCENT OVERLAYS

THE TECHNICAL FIELD

The present invention relates to the elimination of aesthetically unacceptable hues visible through light-colored translucent overlays, and more specifically to a method of eliminating and a laminate which eliminates the unacceptable hues that are created in an area of overlap between a light-colored substrate that reflects a certain wavelength of light to and through a light-colored translucent overlay.

BACKGROUND OF THE INVENTION

Glass and glass-ceramic products are used commonly in the manufacture of, for example, cooktops, appliance and fireplace doors and windows, control panel and backsplash assemblies, refrigerator shelves, and laboratory equipment. In fact, conventional radiant cooktops are frequently manufactured with a light-colored glass-ceramic panel supported by a light-colored porcelain frame. In general, the glass-ceramic panel and the porcelain frame are the same color. Invariably during the manufacture of these radiant cooktops there is an overlap area between the glass-ceramic panel and the porcelain frame. It is in this overlap area that unacceptable hue colorations become visible. The hue colorations are the result of certain wavelengths of light passing through the glass-ceramic panel, reflecting off of the porcelain frame and passing back through the glass-ceramic panel. Common colors of the unacceptable hues include pink, purple and green, and the actual color of the unacceptable hue is dependent upon the wavelengths of light that pass back through the glass-ceramic panel.

For example, when a white glass-ceramic panel is used with a white porcelain frame, the resulting overlap area between the two has an unpleasant pink hue that is visible to the "naked" eye of the consumer. In other words, the white porcelain frame behind the white glass-ceramic panel in the area of overlap appears to have a visible pink hue. Unfortunately, this pink hue is unacceptable, since it detracts from the otherwise totally white appearance of the cooktop.

A method currently used to mask the unacceptable visible hue of such conventional cooktops involves placing a painted steel plate in the overlap area between the glass-ceramic panel and the porcelain frame. Unfortunately, this method is less than ideal since it adds unwanted material and manufacturing labor costs to the cooktop.

SUMMARY OF THE INVENTION

One way to solve the problem of an aesthetically unacceptable hue being visible through an area of overlap between a light-colored translucent overlay and a light-colored substrate is by applying a dark material upon at least one of the light-colored substrate and the light-colored translucent overlay in the area of overlap therebetween. By thereafter sandwiching the dark material between the overlay and the substrate at the area of overlap, certain wavelengths of light that normally pass through the overlay into the substrate and would otherwise reflect off the substrate back to and through the overlay are blocked and/or absorbed by the dark material. As a result, the light-colored translucent overlay in the area of overlap appears in its true light color to the "naked" eye absent the aesthetically unacceptable hue.

In a preferred embodiment of the present invention, the dark material is an adhesive which advantageously bonds the overlay and substrate together without the need for fasteners.

With the above and other objects in view that will hereinafter appear, the nature of the invention will be more clearly understood by reference to the following detailed description, the appended claims and the several views illustrated in the accompanying drawings.

PRIOR ART

Figure 1:
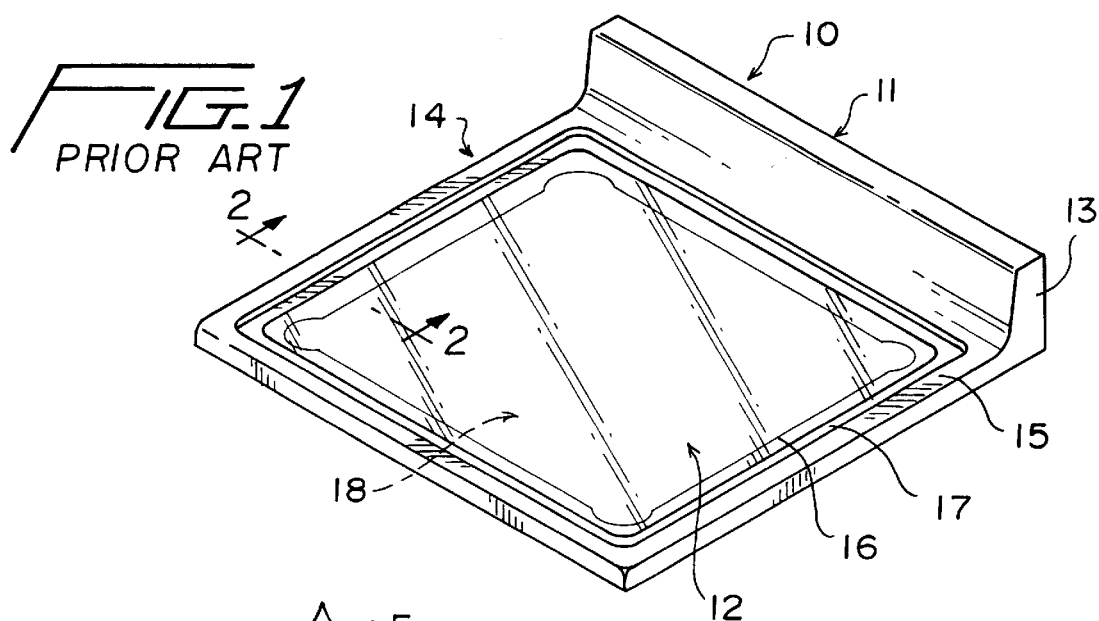
FIG. 1 is a top perspective view, and illustrates a prior art radiant cooktop having a glass and/or glass-ceramic panel disposed in a cooktop frame.

The present invention will be best understood and its novelty and unobviousness appreciated by first describing a typical conventional cooktop possessing the disadvantages hereto discussed.

A prior art radiant cooktop 10 (FIGS. 1 and 2) includes a porcelain frame 11 which supports a glass-ceramic panel 12. Specifically, a white glass-ceramic panel 12 is shown disposed on a white frame 11 which results in the cooktop 10 having an unacceptable pink hue that is visible to the consumer in an area of overlap A (FIG. 2) between the white glass-ceramic panel 12 and the white frame 11. This pink hue gives the impression that the white frame 11 behind the white glass-ceramic panel 12 is pink, which detracts from the otherwise overall white visual appearance of the cooktop 10.

The frame 11 includes a backsplash 13 which is generally perpendicular to and merges with a top 14. The top 14 is generally defined by an outer peripheral wall 15 (FIG. 2), an inner peripheral wall 16 and one or more medial peripheral walls 17 all arranged to define a generally stair-step or stepped configuration. The outer peripheral wall 15 is generally perpendicular to and merges with an outer depending side wall 21 and a first medial depending side wall 22. The first medial depending side wall 22 is generally perpendicular to and merges with the medial peripheral wall 17 which is generally perpendicular to and merges with a second medial depending side wall 23. The second medial depending side wall 23 is generally perpendicular to and merges with the inner peripheral wall 16. The inner peripheral wall 16 is generally perpendicular to and merges with an inner depending side wall 24 which defines an opening 18 of the white frame 11.

The white glass-ceramic panel 12 includes an exterior perimeter edge 25 which is disposed on the white inner peripheral wall 16. The specific area of overlap A is between the exterior perimeter edge 25 of the white glass-ceramic panel 12 and the white inner peripheral wall 16 of the white frame 11.

Incoming visible light is shown by a first arrow line 27 passing through the white glass-ceramic panel 12 and reflecting off the white inner peripheral wall 16 and back out through the white glass-ceramic panel 12 along a second arrow line 28 substantially at which the reflected light can be viewed by a "naked" eye E. As a consequence of passing through the white glass-ceramic panel 12, some of the wavelengths in the visible light spectrum are filtered out and the remaining unfiltered visible light wavelengths that are reflected back out along the second arrow line 28 cause the unacceptable hue coloration (for example, pink in the case of the white-on-white overlap just described). In the cases of other light color-on-light color overlaps, the exact color of the hue that is visible can vary and includes various shades of pink, purple and green.

DESCRIPTION OF THE PREFERRED EMBODIMENT

In accordance with the present invention, a light-colored substrate is coated with a dark coating material in a shape that generally mirrors the exterior outline of a light-colored translucent panel that is disposed upon the substrate at an overlap area therebetween. Alternatively, the light-colored translucent panel is coated with the dark coating material in a shape that generally mirrors the interior outline of the light-colored translucent substrate upon which the light-colored translucent panel is disposed at the overlap area therebetween. In each case the dark material blocks the reflection of light passing through the panel in the area of overlap to prevent the creation of aesthetically unacceptable hues.

The substrate can include, for example, a frame constructed of a porcelain enamel, coated or painted metal, or a plastic surface or a countertop surface made of standard kitchen building materials. In general, the color of the substrate is white, bisque, almond or any other light color that will reflect certain wavelengths of visible light that pass through the light-colored translucent panel back through the light-colored translucent panel. If otherwise provided for by dark coating material, it is this reflection that presents an unacceptable pink, purple or green hue in the area of overlap between the light-colored substrate and the light-colored translucent panel.

The light-colored translucent panel can be a glass-ceramic or a tempered flat glass panel. A "glass-ceramic" is a glass that has a thermal expansion near zero due to submicroscopic crystalline growth that has been deliberately stimulated by heat treatment over a defined temperature-time profile. In general, the color of the panel matches the color of the substrate and can be white, bisque, almond or any other light color.

The present invention can be used in the manufacture of cooktops, fireplace doors and windows, oven door windows, control panel assemblies, back splash assemblies, refrigerator shelves, laboratory hotplates and microwave oven doors where, by placing a dark material coating between a light-colored translucent panel and a light-colored substrate, an unacceptable hue in the area of overlap between the light-colored translucent panel and the light-colored substrate is completely eliminated. The actual color of the unacceptable hue that is imparted depends on the colors of the combined translucent panel and substrate.

Figure 2:
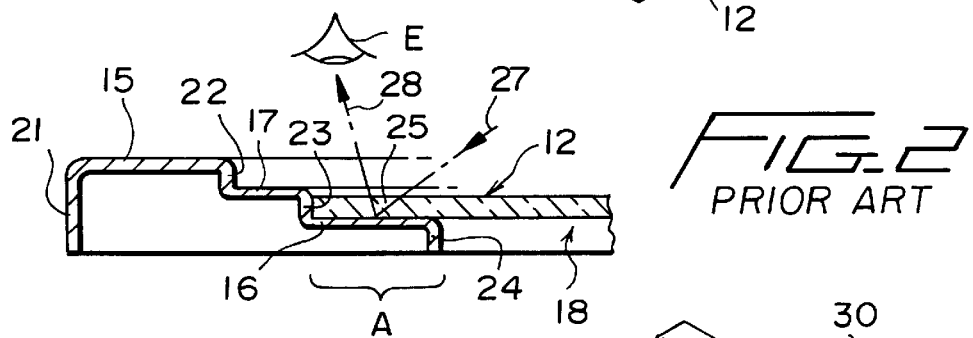
FIG. 2 is an enlarged, fragmentary, cross-sectional view taken generally along line 2—2 of FIG. 1, and illustrates the stepped configuration of the cooktop frame including an inner peripheral wall upon which a peripheral edge of the glass and/or glass-ceramic panel is disposed, and incoming light passing through the panel being reflected by the frame back through the panel to the "naked" eye of a consumer.
Figure 3:
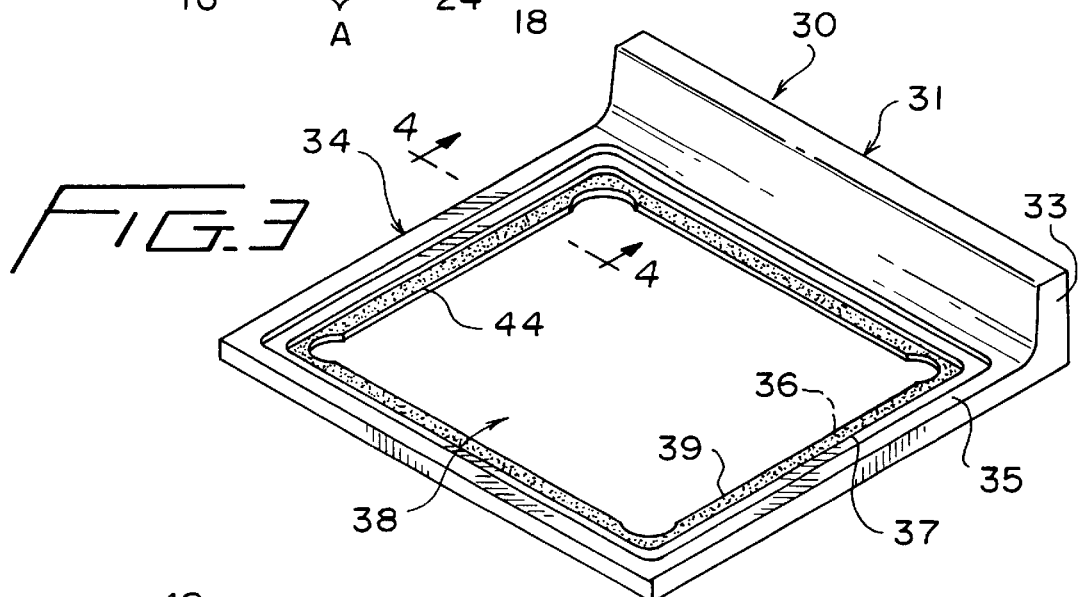
FIG. 3 is a top perspective view of a cooktop frame, similar to that shown in FIG. 1, and illustrates a dark material applied to an inner peripheral wall of the cooktop frame in accordance with the present invention.
Figure 4:
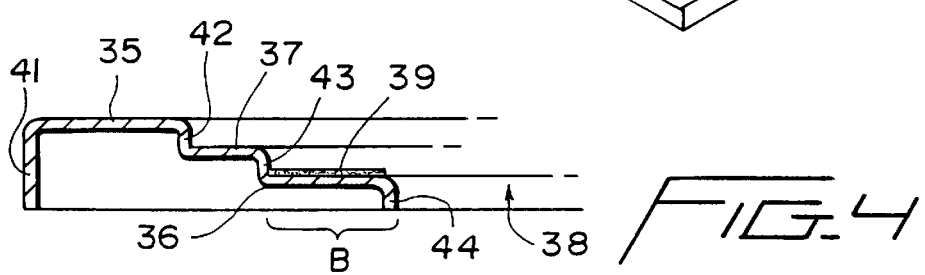
FIG. 4 is an enlarged, fragmentary, cross-sectional view taken generally along line 4—4 of FIG. 3, and illustrates the stepped configuration of the peripheral walls of the cooktop frame with the dark material disposed on the inner peripheral
Figure 5:
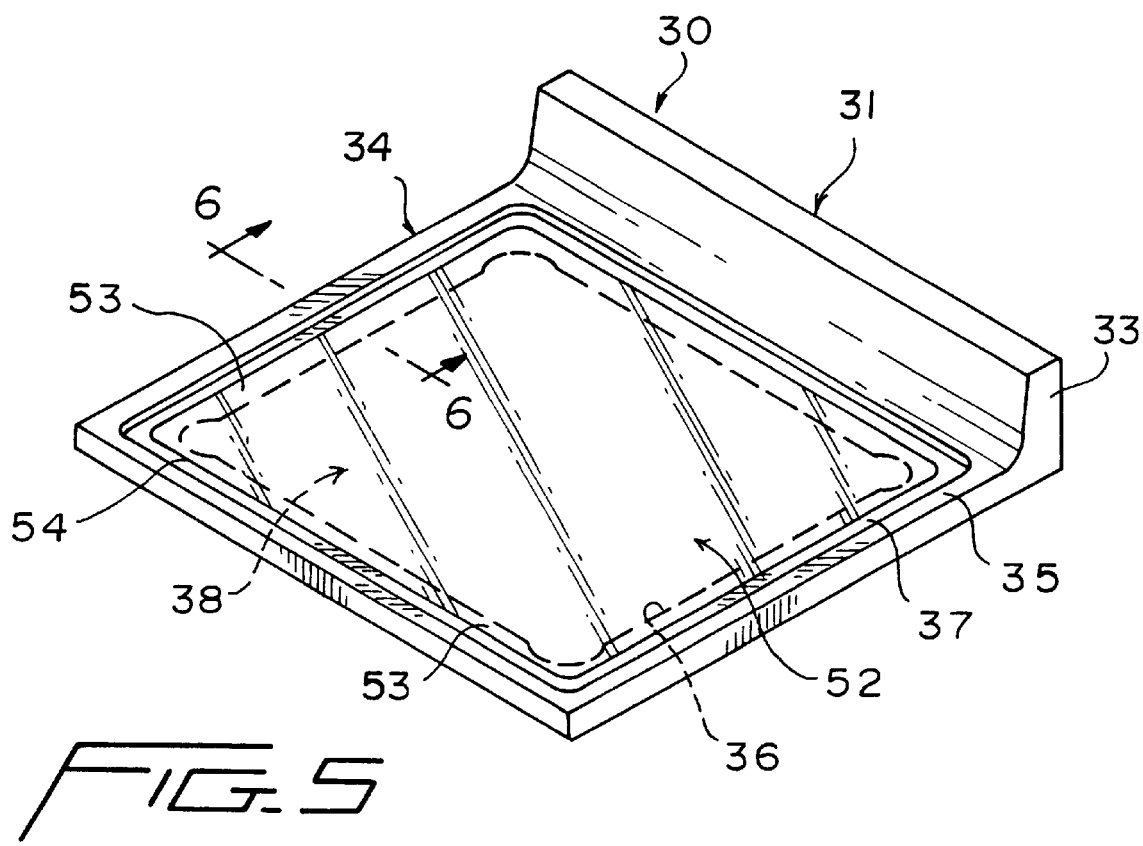
FIG. 5 is a top perspective view of a radiant cooktop of the invention, and illustrates a glass and/or glass-ceramic panel disposed in the cooktop frame of FIG. 3 with the panel completely covering the dark material in the area of overlap between the panel and the cooktop frame.

A radiant cooktop 30 (FIGS. 3 and 4) constructed in accordance with the present invention, which is similar in construction to the radiant cooktop 10 in FIG. 1, includes a white frame or substrate 31 which is configured to support a glass-ceramic panel or overlay 52 (FIG. 5). Specifically, a white glass-ceramic panel 52 is disposed on the white frame 31 in an area of overlap B (FIG. 6).

The white frame 31 includes a backsplash 33 which is generally perpendicular to and merges with a top 34. The top 34 is generally defined by an outer peripheral wall 35 (FIG. 4), an inner peripheral wall or inboard peripheral edge portion 36 and one or more medial peripheral walls 37 all arranged to define a generally stair-step or stepped configuration. The outer peripheral wall 35 is generally perpendicular to and merges with an outer depending side wall 41 and a first medial depending side wall 42. The first medial depending side wall 42 is generally perpendicular to and merges with the medial peripheral wall 37 which is generally perpendicular to and merges with a second medial depending side wall 43. The second medial depending side wall 43 is generally perpendicular to and merges with the inner peripheral wall 36. The inner peripheral wall 36 is generally perpendicular to and merges with an inner depending side wall 44 which defines an opening 38 of the white frame 31.

Figure 6:
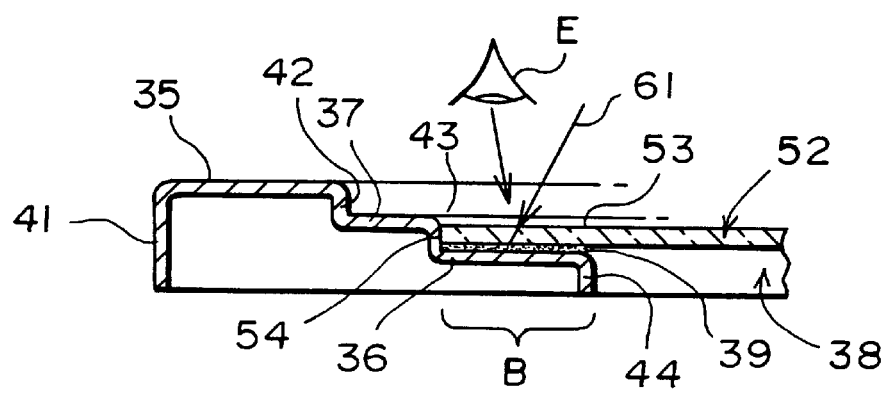
FIG. 6 is an enlarged, fragmentary, cross-sectional view taken generally along line 6—6 of FIG. 5, and illustrates the dark material blocking the reflection of and/or absorbing the incoming light passing through the panel in the area of overlap between the panel and the cooktop frame.

The white glass-ceramic panel 52 includes an exterior perimeter edge or outboard peripheral edge portion 53 which is disposed on the white inner peripheral wall 36 in the area of overlap B (FIG. 6). The white glass-ceramic panel 52 also includes a terminal edge 54 which abuts the second medial side wall 43 of the white frame 31.

A coating 39 of material is applied to the inner peripheral wall 36 at the area of overlap B (FIG. 4). As a result, the coating 39 is sandwiched in the area of overlap B between the exterior perimeter edge 53 of the white glass-ceramic panel 52 and the inner peripheral wall 36 of the white frame 31. In general, the coating 39 is a dark-colored material. For example, the coating 39 is a black or dark gray temperature-resistant RTV silicone adhesive, such as Pactan® 6079, which is manufactured by Heidelberger Bauchemie GmbH of Germany. Although the dark coating 39 is shown applied to the inner peripheral wall 36 at the specific area of overlap B, it can also be applied to the white glass-ceramic panel 52 before the white glass-ceramic panel 52 is placed on the inner peripheral wall 36 to cover the opening 38. Regardless of where the dark coating 39 is applied, the amount applied generally exactly covers the area of overlap B between the white glass-ceramic panel 52 and the inner peripheral wall 36. If the dark coating 39 covers less than the area of overlap B, a small area will still appear to have the unacceptable hue coloration. Conversely, if the dark coating 39 covers more than the area of overlap B, the dark coating 39 will be visible, which is also not acceptable. Another benefit of using the RTV silicone adhesive as the dark coating 39 is that additional fastening materials can be eliminated, since the dark coating 39 has sufficient adhesive strength to bond the white glass-ceramic panel 52 to the white frame 31.

Although the dark coating 39 is shown disposed on only the inner peripheral wall 36, the dark coating 39 can also be applied to one or both of the second medial depending side wall 43 and the inner depending side wall 44 in order to more completely mask any reflection of the unacceptable wavelengths of visible light from these surfaces back through the terminal edge 54 and/or the area of overlap B. Similarly, the dark coating 39 can also be extended to cover the entire surface of the top 34 of the white frame 31. For example, if the white glass-ceramic panel 52 is disposed on the medial peripheral wall 37, the dark coating 39 would be applied to completely cover the inner depending side wall 44, the inner peripheral wall 36, the second medial depending wall 43, the medial peripheral wall 37 and the first medial depending side wall 42. Likewise, if the white glass-ceramic panel 52 is disposed on the outer peripheral wall 35, in addition to the areas of the white frame 31 coated in the previous example, the dark coating also would be applied to the outer peripheral wall 35. The actual area to be coated is determined by the size and shape of the translucent glass-ceramic panel that is to be placed on the top 34 of the white frame 31.

In accordance with the present invention, the frame or substrate 31 can also be configured to include multiple openings and/or a solid continuous surface in any desired shape or size. For example, when a solid continuous surface is used, the boundary of an area of overlap on the surface of the substrate that would need to be coated with the dark coating 39 is equal to the size of a perimeter of a translucent glass-ceramic panel 52 to be placed on the surface of the substrate. Alternatively, the side of the translucent glass-ceramic panel 52 that will be disposed against the substrate 31 can be completely coated with the dark coating 39.

Incoming visible light is shown by a first arrow line 61 passing through the white glass-ceramic panel 52 which is absorbed by the dark coating 39 underneath the white glass-ceramic panel 52 in the specific area of overlap B (FIG. 6). It is the absorption of this visible light by the dark coating 39 that masks the unacceptable hue coloration from being visible to the "naked" eye E. As a consequence of passing through the white glass-ceramic panel 52, some of the wavelengths in the visible light spectrum are filtered out, and the remaining unfiltered visible light wavelengths are absorbed by the dark coating 39. Thus, the white glass-ceramic panel 52 appears in its true light color to the "naked" eye E without any unacceptable hue coloration. The only hue that may be visible is a light grayish hue due to the dark coating 39. However, this grayish hue is acceptable since it is generally consistent with the appearance of the rest of the white glass-ceramic panel 52.

In addition to the visible light masking properties, in the illustrated embodiment of the present invention, the RTV silicone adhesive 39 is temperature resistant and also can serve as a dampening agent between the translucent glass-ceramic panel 52 and the frame 31.

In accordance with the present invention, the selection of the specific color/shade of the dark coating 39 depends on the color of the translucent glass-ceramic panel 52 and also the color of the frame 31 upon which the translucent glass-ceramic panel 52 is disposed. In general, the color of the dark coating 39 is selected to prevent the unfiltered visible wavelengths of light from reflecting off the frame 31 and back through the translucent glass-ceramic panel 52. The wavelengths for the visible light spectrum which are blocked/absorbed by the dark coating 36 range from approximately 340 to 760 nanometers.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of eliminating an aesthetically unacceptable hue visible to the "naked" eye normally created at an area of overlap between a substantially light-colored substrate that reflects a certain wavelength of light to and through a substantially light-colored translucent overlay comprising the steps of:
    applying a substantially dark material to at least one of a substantially light-colored substrate and a substantially light-colored translucent overlay upon an area of subsequent overlap of the substrate and the overlay, and
    sandwiching the substantially dark material between the overlay and the substrate at the area of overlap whereby certain wavelengths of light normally passing through the overlay into the substrate and being reflected by the substrate back to and through the overlay are blocked by the substantially dark material whereby the substantially light-colored translucent overlay in the area of overlap appears in its true light color to the "naked" eye absent an aesthetically unacceptable hue.

2. The method as defined in claim 1 wherein the substrate is porcelain.

3. The method as defined in claim 1 wherein the overlay is glass.

4. The method as defined in claim 1 wherein the overlay is glass-ceramic.

5. The method as defined in claim 1 wherein the substrate is porcelain and the overlay is glass.

6. The method as defined in claim 1 wherein the substrate is porcelain and the overlay is glass-ceramic.

7. The method as defined in claim 1 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

8. The method as defined in claim 1 wherein the dark material is an adhesive bonding together the substrate and the overlay at the area of overlap.

9. The method as defined in claim 1 wherein the dark material is an RTV silicone adhesive bonding together the substrate and the overlay at the area of overlap.

10. The method as defined of claim 1 wherein the substrate is porcelain enamel.

11. The method as defined in claim 1 wherein the substrate is porcelain enamel and the overlay is glass-ceramic.

12. The method as defined in claim 1 wherein the substrate is porcelain enamel, the overlay is glass-ceramic and the dark material is an RTV adhesive.

13. The method as defined in claim 12 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

14. A laminate which eliminates an aesthetically unacceptable hue visible to the "naked" eye normally created at an area of overlap between a substantially light-colored substrate that reflects a certain wavelength of light to and through a substantially light-colored translucent overlay comprising:
    at least one substantially light-colored substrate and a substantially light-colored translucent overlay defining an area of overlap of the substrate and overlay, and a substantially dark material disposed in the area of overlap between the overlay and the substrate whereby certain wavelengths of light normally passing through the overlay into the substrate and being reflected by the substrate back to and through the overlay are blocked by the substantially dark material whereby the substantially light-colored translucent overlay in the area of overlap appears in its true light color to the "naked" eye absent an aesthetically unacceptable hue.

15. The laminate as defined in claim 14 wherein the substrate is porcelain.

16. The laminate as defined in claim 14 wherein the overlay is glass.

17. The laminate as defined in claim 14 wherein the overlay is glass-ceramic.

18. The laminate as defined in claim 14 wherein the substrate is porcelain and the overlay is glass.

19. The laminate as defined in claim 14 wherein the substrate is porcelain and the overlay is glass-ceramic.

20. The laminate as defined in claim 14 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

21. The laminate as defined in claim 14 wherein the dark material is an adhesive bonding together the substrate and the overlay at the area of overlap.

22. The laminate as defined in claim 14 wherein the dark material is an RTV silicone bonding together the substrate and the overlay at the area of overlap.

23. The laminate as defined in claim 14 wherein the substrate is porcelain enamel.

24. The laminate as defined in claim 14 wherein the substrate is porcelain enamel and the overlay is glass-ceramic.

25. The laminate as defined in claim 14 wherein the substrate is porcelain enamel, the overlay is glass-ceramic and the dark material is an RTV adhesive.

26. The laminate as defined in claim 25 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

27. A method of eliminating an aesthetically unacceptable hue visible to the "naked" eye normally created at an area of overlap between a substantially light-colored substrate that reflects a certain wavelength of light to and through a substantially light-colored translucent overlay comprising the steps of:

applying a substantially dark material to at least one of a substantially light-colored substrate and a substantially light-colored translucent overlay upon an area of subsequent overlap of the substrate and the overlay, and sandwiching the substantially dark material between the overlay and the substrate at the area of overlap whereby wavelengths of light substantially in the range of 340 to 760 nanometers normally passing through the overlay into the substrate and being reflected by the substrate back to and through the overlay are blocked by the dark material whereby the substantially light-colored translucent overlay in the area of overlap appears in its true light color to the "naked" eye absent an aesthetically unacceptable hue.

28. The method as defined in claim 27 wherein the substrate is porcelain and the overlay is glass.

29. The method as defined in claim 27 wherein the substrate is porcelain and the overlay is glass-ceramic.

30. The method as defined in claim 27 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

31. The method as defined in claim 27 wherein the dark material is an RTV silicon adhesive bonding together the substrate and the overlay at the area of overlap.

32. The method as defined in claim 27 wherein the substrate is porcelain enamel, the overlay is glass-ceramic and the dark material is an RTV adhesive.

33. The method as defined in claim 32 wherein the substrate is an open frame having an inboard peripheral edge portion and the overlay is a piece of glass having an outboard peripheral edge portion seated upon the open frame inboard peripheral edge portion, and the dark material is sandwiched between the peripheral edge portions.

* * * * *